P. HANSON.
CREAM TEMPERING DEVICE.
APPLICATION FILED SEPT. 23, 1911.

1,095,729.

Patented May 5, 1914.

Witnesses:

Inventor:
Paul Hanson

UNITED STATES PATENT OFFICE.

PAUL HANSON, OF WILD HORSE, COLORADO.

CREAM-TEMPERING DEVICE.

1,095,729.   Specification of Letters Patent.   Patented May 5, 1914.

Application filed September 23, 1911. Serial No. 650,895.

*To all whom it may concern:*

Be it known that I, PAUL HANSON, a citizen of the United States, residing at Wild Horse, in the county of Cheyenne and State of Colorado, have invented certain new and useful Improvements in Cream-Tempering Devices, of which the following is a full, clear, and exact specification.

The invention relates to devices for tempering or regulating the temperature of cream preparatory to churning in the process of butter-making.

The primary object of the invention is to provide a simple and efficient device for tempering and ripening cream before beginning the operation of churning.

A further object of the invention is to provide a simple and efficient device which may be removably inserted within a churn for the purpose of ripening the cream placed therein and regulating the temperature of the same before churning, thus dispensing with the necessity for the use of so-called pasteurizers, tempering or ripening vats and the like, as ordinarily used in creameries since I employ the churn body as a receptacle to hold the cream during the process of ripening and tempering.

Other objects of the invention will hereinafter appear and are shown in the accompanying drawings forming part of the specification, in which—

Figure 1:
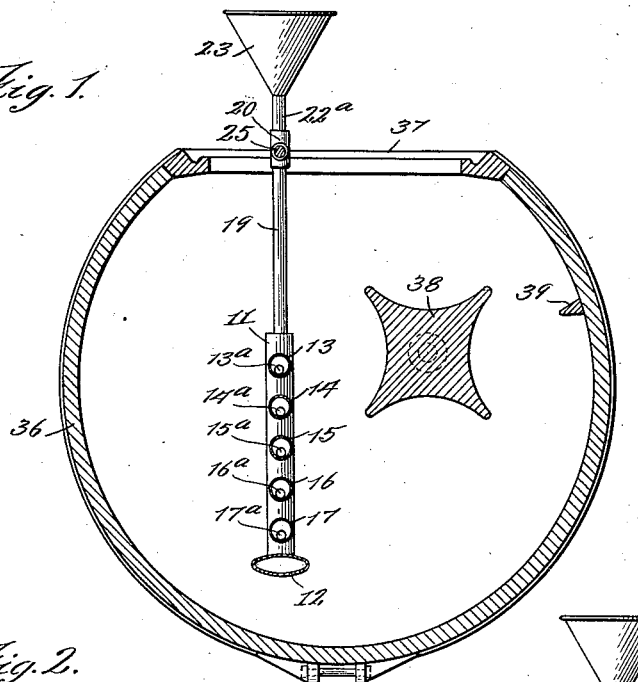

Figure 1 is a sectional view through a churn, showing the manner of removably inserting the device into the same for tempering cream contained therein. This view is taken on line 1—1 of Fig. 2, which latter is a vertical longitudinal sectional view through the churn disclosing other details of construction of the device.

Figure 2:
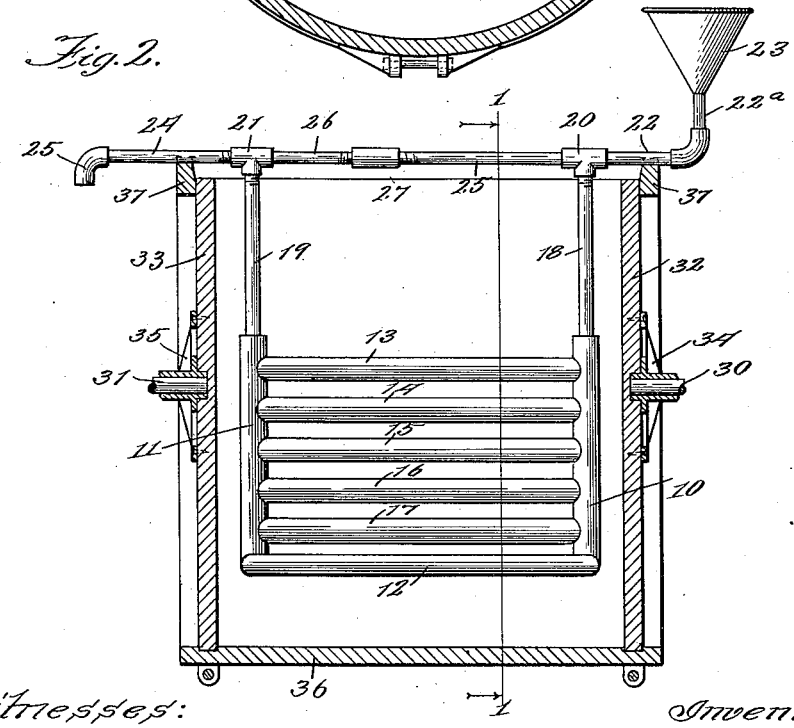

In the preferred embodiment of the invention as shown in the drawings the device consists of two vertical tubes 10, 11, which are joined at their lower extremities by an enlarged connecting tube indicated by the reference character 12, the same being preferably oval in shape and much larger in cross-section with its opening correspondingly enlarged as shown in Fig. 1. The vertical tubes 10 and 11, as well as the bottom connecting tube 12, are made of suitable material, as some form of metal preferably quite thin, in order that the temperature of liquids within these tubes may be readily imparted to the surrounding cream within the churn. I preferably use a suitable grade of sheet metal or block tin, although other suitable metals may be employed. Made of the same material although preferably not larger in cross-section than the vertical members 10 and 11, are a plurality of cross connecting tubes 13 to 17 inclusive, preferably cylindrical in cross-section as indicated in Fig. 1, and having their ends soldered or brazed to the vertical tubes 10, 11. Like the tubes 10, 11 and 12, the cross connecting tubes 13 to 17 inclusive are hollow on their interior, but communicate with the vertical tubes 10, 11 through restricted openings, as indicated at $13^a$, $14^a$, $15^a$, $16^a$ and $17^a$, Fig. 1. These restricted connections are formed by soldering or brazing the tubes 13 to 17 inclusive to the exterior walls of the vertical tubes 10, 11 and allowing the walls to remain except for the small openings $13^a$ to $17^a$ inclusive, as indicated. These restricted openings at the end of the cross connecting tubes 13 to 17 inclusive are provided in order to restrict the flow of liquid through these tubes when such liquid or fluid of the desired temperature is passed through the device when it is inserted within the churn as shown in Figs. 1 and 2 with the tempering device and particularly the tubular portions just described in direct contact with the cream to be tempered. Extending upwardly from tubular members 10, 11 are pipes 18, 19, which are connected through suitable T joints as indicated at 20, 21. Connected with joint 20 is the lateral pipe 22, which a short distance beyond the normal wall of the churn is given a right angle turn, as indicated at $22^a$ and terminates in the funnel 23. Beyond the T joint 21 is an outlet duct, consisting of an open pipe 24, terminating preferably in a downwardly discharging nozzle 25. As a means of securing the vertical tubes 18, 19 in relation to each other a rod is preferably threaded into the T connections 20, 21 at each of its ends, joining them together, such rod being preferably divided as indicated at 25, 26 and joined by the connection 27, in which they are screw-threaded. The vertical tubes 18, 19 as well as tubes 22, 24, and rods 25 and 26 are screw-threaded into the T joints 20, 21, in order that these parts may be readily assembled for purposes of shipment or removal. Although it is preferred that the connection consisting of the members 25 and 26 shall be solid rods, hollow tubes may be used, provided the entrance thereto in the T members 20, 21 be closed, as it is not desired there shall be communication through members 25 and 26.

As before stated, the device is adapted to be used for the purpose of tempering material within a churn and the device is adapted to be used in connection with any form of churn.

In Figs. 1 and 2 the device is illustrated as applied to a cylindrical churn adapted to rotate on horizontal axis as on bearing pins or shafts indicated at 30, 31, the heads of the churn being indicated at 32, 33, and bearing pins or shafts 30, 31 supported in suitable bearing members 34, 35 secured to the heads 32, 33 of the churn. The walls of the churn are indicated at 36, and the removable cover through which my improved cream tempering device is adapted to be inserted to extend into the interior of the churn is indicated at 37. The lengths of the various parts of the device will be governed by the size of the churn to which the device is to be applied.

In the present embodiment of the invention it will be seen that various tubular parts making up the portion adapted to contain the heated water for tempering the material wthin the churn are so determined that the device extends well toward the bottom of the cream chamber at its lowest extremity and the vertical tubes 18, 19 are adjacent the ends or heads of the churn. The horizontal pipe extensions 22, 24 projecting beyond the T joints 20, 21 furnish a convenient means for supporting the device and allowing the heating tubes of the same to extend on the interior of the churn. The upper edges of the door jambs surrounding opening 37 are preferably notched as illustrated in Fig. 2, to give the tempering device a firm support in order that it may be vibrated on pipe extensions 22, 24 as a center, allowing the heating tubes on the interior of the churn to swing and so contact with various parts successively of the fluid within the churn for the purpose of more rapidly tempering the fluid.

In the process of making butter it will be found desirable to bring cream just before churning to a temperature of say from 52 to 56 degrees Fahrenheit in order to obtain the best results. Also in ripening cream preparatory to the churning operation it is found desirable to increase the temperature, particularly to counteract the effects of certain kinds of weather, thus hastening the ripening process. For this purpose various forms of pasteurizers and ripening vats have been used separate and apart from the churning mechanism. This operation with my improved device is simplified, the material to be ripened or tempered being placed within the churn and treated with the device described within the churn before beginning the operation of churning. If it is desired to increase the temperature of the cream within the churn upon inserting the device in the manner indicated within the churn and in contact with the cream therein, hot water will be passed through the device by pouring the same into funnel 23, the liquid passing downwardly through vertical pipe 22$^a$, horizontal pipe 22, T-joint 20 and vertical tube 18 into the enlarged tempering tube 10, thence through horizontal tube 17, vertical tube 11, and the liquid having imparted its heat to the materials within the churn will pass thence outwardly through vertical pipe 19, T-joint 21, horizontal pipe 24 and discharge nozzle 25. During the downward progress of the liquid through tempering tube 10, portions of the liquid will pass through horizontal tempering tubes 13 to 17 inclusive and out into vertical tube 11, and thence out of the device as indicated.

If instead of increasing the temperature of the cream within the churn it is desired to decrease the same, it will be apparent that the device may be used by passing instead of heated water or other liquid, chilled water or other refrigerating material which in circulating through the device in the manner indicated, will absorb the heat from the surrounding cream within the churn. It will be apparent that the process of tempering may be hastened by agitating the liquid within the churn in relation to the tempering device, or by the more convenient method as described of swinging the tempering device on the horizontal axis 22, 24 on the notched door jamb of the churn.

The churn to which the device is shown applied in Fig. 1 is provided with the usual agitating roller 38 and the cleats shown in section at 39 to assist in agitating the materials on the interior of the churn during the churning operation. These parts are illustrated merely as typical of the type of churn to which the invention is shown applied.

The preferred embodiment of the invention has been described, but it is not desired to be limited to the exact details shown for it will be apparent that those skilled in the art may resort to many modifications in the details of construction without departing from the purpose and spirit of the invention.

I claim:

1. A freely removable cream tempering device for churns and the like comprising a tubular member provided at its extremities with approximately parallel tubular branches, a plurality of supplementary tubular members parallel to the first said tubular member and secured at their extremities to the parallel tubular members with openings in the last said tubular members of a restricted area in comparison with the openings in the cross connected tubular members, and means for affording a circulation of tempering fluid through the tubular members.

2. A removable cream tempering device, for churns and the like comprising a substantially U-shaped tubular member provided with an unrestricted passageway therethrough for the circulation of tempering fluid means affording independent restricted communication between the branches of the U-shaped member, and adjustable strengthening means interposed between said branches of the U-shaped member.

3. An article of manufacture consisting of a substantially U-shaped member with unrestricted passageway therethrough for the passage of fluid, means affording restricted communication between the branches of the member, a strengthening bar secured to the upper ends of said member and constituting a handle by means of which the member may be inserted and removed, a funnel connected to one of the branches by means of which the fluid may be admitted, and a discharge tube connected to the other branch.

4. An article of manufacture consisting of a substantially U-shaped member with unrestricted passageway therethrough for the passage of fluid, means affording restricted communication between the branches of the member, members threaded in the ends of the said branches and provided at their other end with a T connector, a cross bar connecting said T's to strengthen the upper branches of the member and provide means to insert and remove the said article, a tubular connection and a funnel connected to one of said T's, and a discharge tube connected to the other.

5. The combination with a butter making machine, consisting of a normally closed vessel provided with a removable closure member coöperating with an opening in said vessel, of a freely removable cream tempering device adapted to be passed through the said opening for inserting the same into and removing it from the interior of the butter making machine, said tempering device being entirely disconnected from the machine and comprising inlet and outlet pipes provided with separated passages and restricted tubular connections between the said pipes and their respective passages for diffusing tempering fluid passing through the said inlet and outlet pipes.

In testimony whereof I have signed my name to this specification, in the presence of two subscribing witnesses, on this 13th day of September A. D. 1911.

PAUL HANSON.

Witnesses:
CARL K. BENNETT,
F. B. BENNETT.

---

Copies of this patent may be obtained for five cents each, by addressing the "Commissioner of Patents, Washington, D. C."